United States Patent
Ho et al.

(10) Patent No.: US 8,057,034 B2
(45) Date of Patent: Nov. 15, 2011

(54) METHODS AND APPARATUSES FOR ENHANCING PERIPHERAL VISION

(75) Inventors: Arthur Ho, Coogee (AU); Andrew Robert Whatham, Lindfield (AU); Brien Anthony Holden, Kingsford (AU); Padmaja Rajagopal Sankaridurg, Maroubra (AU); Aldo Abraham Martinez, Coogee (AU); Earl Leo Smith, III, Houston, TX (US)

(73) Assignee: Brien Holden Vision Institute, Sydney (AU)

( * ) Notice: Subject to any disclaimer, the term of this patent is extended or adjusted under 35 U.S.C. 154(b) by 0 days.

(21) Appl. No.: 12/256,705

(22) Filed: Oct. 23, 2008

(65) Prior Publication Data

US 2009/0122264 A1     May 14, 2009

Related U.S. Application Data

(60) Provisional application No. 60/982,784, filed on Oct. 26, 2007.

(51) Int. Cl.
     *G02C 7/06* (2006.01)
(52) U.S. Cl. ....................................................... 351/161
(58) Field of Classification Search .............. 351/160 R, 351/161, 164, 168
     See application file for complete search history.

(56) References Cited

U.S. PATENT DOCUMENTS

| | | | |
|---|---|---|---|
| 5,139,325 A | 8/1992 | Oksman et al. | |
| 5,448,312 A | 9/1995 | Roffman et al. | |
| 5,485,228 A | 1/1996 | Roffman et al. | |
| 5,929,969 A | 7/1999 | Roffman | |
| 6,457,826 B1 | 10/2002 | Lett | |
| 6,474,814 B1 | 11/2002 | Griffin | |
| 6,537,317 B1 | 3/2003 | Steinert et al. | |
| 6,752,499 B2 | 6/2004 | Aller | |
| 7,025,460 B2 | 4/2006 | Smith, III et al. | |
| 7,503,655 B2 | 3/2009 | Smith, III et al. | |
| 2001/0033363 A1 | 10/2001 | Chateau et al. | |
| 2003/0045931 A1 | 3/2003 | Lang | |
| 2008/0084534 A1* | 4/2008 | Lindacher et al. | 351/161 |
| 2009/0257026 A1* | 10/2009 | Varnas et al. | 351/209 |

FOREIGN PATENT DOCUMENTS

| | | |
|---|---|---|
| EP | 0742464 A2 | 11/1996 |
| EP | 0940693 A2 | 9/1999 |
| EP | 0819258 | 12/2001 |
| WO | 9616621 | 6/1996 |
| WO | 9941633 | 8/1999 |
| WO | 9966366 | 12/1999 |
| WO | 2004068214 | 8/2004 |
| WO | WO-2007092853 | 8/2007 |

(Continued)

OTHER PUBLICATIONS

Atchison, David A., et al., "Designing lenses to correct peripheral refractive errors of the eye," Jan. 2002, J. Opt. Soc. Am. A, vol. 19, No. 1, pp. 10-18.

(Continued)

*Primary Examiner* — Darryl J Collins
(74) *Attorney, Agent, or Firm* — Smith Moore Leatherwood LLP

(57) ABSTRACT

Methods and apparatuses are disclosed for improving peripheral vision by positioning the peripheral image points at a pre-determined and precise position relative to the retina to achieve optimal performance according to one or more pre-selected criteria parameters for optimal peripheral vision performance.

3 Claims, 6 Drawing Sheets

FOREIGN PATENT DOCUMENTS

WO    WO-2009055638    4/2009

OTHER PUBLICATIONS

Gustafsson, Jorgen, et al., "Peripheral astigmatism in emmotropic eyes," Mar. 2001, Ophthal. Physiol. Opt., vol. 21, No. 5, pp. 393-400.

Hoogerheide, J., et al., "Acquired Myopia in Young Pilots," 1971, Ophthalmologica, vol. 163, pp. 209-215.

Mutti, Donald O., et al., "Peripheral Refraction and Ocular Shape in Children," Apr. 2000, JOVS, vol. 41, No. 5, pp. 1022-1030.

Seidemann, Anne, et al., "Peripheral refractive errors in myopic, emmetropic, and hyperropic young subjects," Dec. 2002, J. Opt. Soc. Am. A, vol. 19, No. 12, pp. 2363-2373.

Stone, R.A., and Flitcroft, D.I., "Ocular Shape and Myopia," 2004, Annals Acad Med Singapore, vol. 33, No. 1, pp. 7-15.

Unsbo, Peter, et al., "Oblique astigmatism and curvature of field in human eye," 2000, Proc. Northern Optics, P0130.

Zhu, Xiaoying, et al., "Potency of Myopic Defocus in Spectacle Lens Compensation," JOVS, Jul. 2003, vol. 44, No. 7, pp. 2828-2827.

Schmid, Gregor F., "Variability of retinal steepness at the posterior pole in children 7-15 years of age," Current Eye Research, 2003, vol. 27, No. 1, pp. 61-68.

Walker, Terry W., "The Effect of Accommodation on Ocular Shape," Optometry and Vision Science, Jul. 2002, vol. 79, No. 7, pp. 424-430.

* cited by examiner

METHODS AND APPARATUSES FOR ENHANCING PERIPHERAL VISION

RELATED APPLICATION DATA

This application claims the benefit of U.S. Provisional Application No. 60/982,784 filed Oct. 26, 2007, the entire contents of this document is herein incorporated by reference.

FIELD OF THE INVENTION

The present invention relates generally to methods and apparatuses for substantially concurrently conditioning central and peripheral vision. More specifically, embodiments of the present invention relate to the methods and apparatuses for conditioning and improving vision substantially beyond the central vision.

BACKGROUND

Our earlier work in the field of methods and apparatuses for retarding or eliminating the progression of myopia (short-sightedness) in an individual by controlling off-axis (peripheral) aberrations concerned manipulating the curvature of field of a visual image while simultaneously providing clear central imaging. This earlier work was the subject of and commonly assigned U.S. Ser. No. 11/349,295, filed Feb. 7, 2006, now U.S. Pat. No. 7,503,655 which is a continuation-in-part of U.S. Ser. No. 10/887,753, filed Jul. 9, 2004, now U.S. Pat. No. 7,025,460. The entire contents of these documents are herein incorporated by reference as if made a part of the present specification.

These earlier works related to methods of abating, retarding or eliminating the progression of refractive errors (i.e. myopia or hyperopia) in an individual by controlling off-axis aberrations, through manipulating the curvature of field of a visual image in a predetermined fashion and ultimately altering, reducing or eliminating eye axial elongation. It had been discovered that the peripheral retinal image (i.e. peripheral vision) plays a major role in determining eye growth, and is an effective stimulus that controls axial elongation that leads to myopia.

Therefore, these cited, earlier works concerned methods by which myopia progression may be retarded (and in many cases, halted or reversed) with the use of a novel optical device having a predetermined off-axis aberration-controlled design that abates, retards or eliminates eye growth.

More specifically it was determined that the progression of myopia could be modified by precise, predetermined control of the off-axis optical corrective factors, or aberrations of the corrective device, or the combined off-axis optical aberrations of the eye and corrective device, such that the visual image has a peripheral field image location that is positioned more anteriorly to (or in front of) the peripheral retina (i.e. towards the cornea or the front of the eye) than normally in the uncorrected condition or with traditional correction devices or strategies, while the central field image location is positioned near the central retina (i.e. the fovea). This arrangement minimizes or eliminates the stimulus for eye axial elongation that leads to myopia. And since the device does not introduce any central field defocusing (as are, for example, introduced by under-correction methods, or bifocal or progressive optical devices) the devices of the invention of the cited earlier works provide the wearer with good visual acuity. Thus, those earlier efforts have been directed to peripheral field manipulation for the specific purposes of alleviating myopia progression.

It has now been discovered that, by precisely locating or directing peripheral images substantially on the periphery of the retina, one can achieve highly and selectively enhanced peripheral vision while substantially simultaneously achieving corrected, clear central vision. This "wide-angle" approach to vision correction, can lead to greatly enhanced vision, or "global vision" (i.e. improved or enhanced vision across the "globus oculi"—the eye-ball—or large expanses of the total field of vision including both central and peripheral) that would benefit not only individuals who are conventionally considered to be "ametropes" (individuals with central refractive errors; who are conventionally deemed to require refractive vision correction), but all individuals—including individuals who are conventionally considered to be "emmetropes" (individuals without central refractive errors) but who may be ametropic in their peripheral vision. This new approach to vision correction would be especially useful to people with highly selective or specialized vision needs in the peripheral field.

SUMMARY OF THE INVENTION

According to embodiments of the present invention, vision is substantially simultaneously controlled from central vision to peripheral vision; in which peripheral vision may include the para-central, or mid-peripheral or far peripheral visual regions. Such vision control leads to improved visual performance by manipulating the positional image foci of an individual, such that the central and peripheral images are intentionally and substantially simultaneously directed to central and peripheral retinal surfaces respectively. Depending on the specific visual needs of the individual, manipulation of the position of the image foci may be such as to place them directly on the retina, or some other desirable positional relationship.

Further objects, advantages and embodiments of the invention will become evident from the reading of the following detailed description of the invention wherein reference is made to the accompanying drawings.

Note that lower contrast thresholds indicate better contrast sensitivity, which is one measure or criterion of visual performance.

Figure 10:
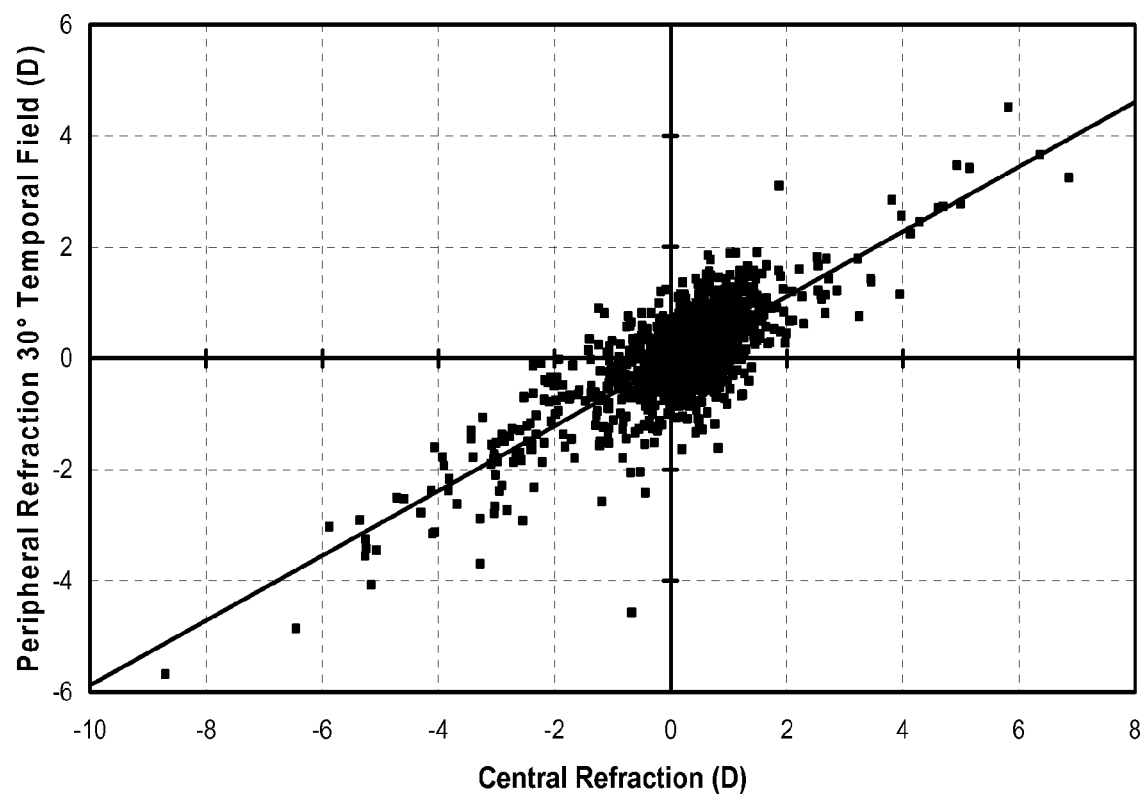

FIG. 10 is a plot of peripheral refractive state as measured at 30 degree along the horizontal-nasal visual field against central refractive state for the right eye of 1603 subjects.

Figure 11:
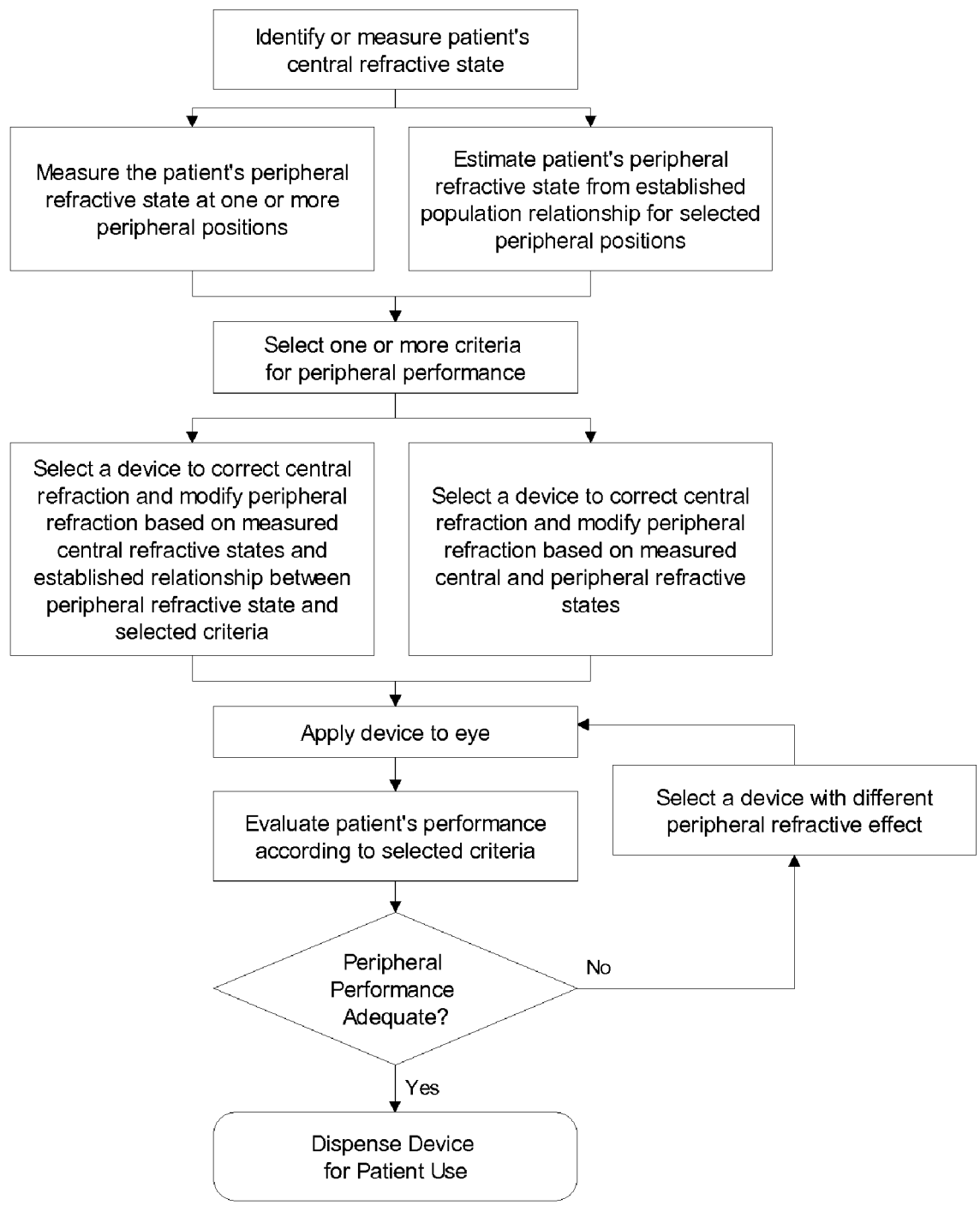

FIG. 11 is a flow-chart describing a protocol for improving and enhancing peripheral visual performance with a device of the present invention.

DETAILED DESCRIPTION OF THE INVENTION

Conventionally, corrective vision devices and methods correct only the central (or foveal) vision. This practice is based on the knowledge that the fovea (considered the center of vision) is the most acute part of the retina in terms of visual acuity and also image resolution. The eye will naturally rotate to "fixate" on the visual object of interest (i.e. changing the direction of gaze of the eye to place the part of the visual image of most interest onto the fovea) to make use of the maximum acuity available at the fovea. Thus, to date, the central and only concern, when prescribing refractive vision correction is to improve the end-result for central or foveal vision. This has implicitly resulted in seeking to improve a patient's central vision to the exclusion of imaging for the peripheral retina, and often at the expense of peripheral vision. Indeed, this lack of attention paid to imaging for the peripheral region indirectly contributed to the advances in the treatment of myopia progression set forth in our above-cited earlier work. At that time, attempts at myopia progression treatments failed to offer treatment solutions that allowed for myopia treatments by manipulating peripheral defocus, while substantially simultaneously providing clear images in the central vision. Our earlier work overcame this shortcoming in the field. However, in our earlier work, the stated goal of retarding and/or reversing myopia progression dictated the specific peripheral defocus or stimulus required, without regard for the state of a patient's resultant peripheral vision. Indeed, in many prescribed methods, to achieve the retardation or cessation of myopia progression, the induced peripheral defocus stimuli could potentially reduce peripheral vision, if it was deemed necessary to insure good central vision, while treating the myopia.

Our new research findings have revealed the possibility and desirability for precisely tuning peripheral focus to precise peripheral retina locations, for the purpose of attaining, substantially simultaneously with good central vision, significantly, enhanced peripheral vision, and, therefore, overall vision.

It is presently understood that peripheral refraction can be "ametropic" (i.e. a state of being incorrectly focused; which may include being myopic, hyperopic or astigmatic and is the opposite of "emmetropic"; a state of being correctly focused) for individuals. The peripheral refractive state does not always precisely match the central refractive state. For example, an eye may have a correctly focused central image point (i.e. is emmetropic centrally), but whose mid-peripheral image points may be out of focus (i.e. ametropic peripherally). Any other combinations are possible, including (without being exhaustive) centrally hyperopic and peripherally even more hyperopic, centrally myopic and peripherally emmetropic, etc. The consequence is that a device (such as used conventionally) that only corrects the central refractive state will not intentionally (and often does not) correct the peripheral refractive state. For those devices, while central vision is corrected or improved, peripheral vision may be degraded or suffer.

According to embodiments of the present invention, methods and apparatuses are disclosed for improving peripheral vision by positioning the peripheral image points at a predetermined and precise position relative to the retina to achieve optimal performance according to one or more preselected peripheral criteria parameters for optimal peripheral visual performance. Embodiments of the present invention contemplate both the process of 'finding' the optimal position and offering prescriptive solutions to effect the peripheral vision improvement.

The principles and bases of the present invention are described in the following sections with reference to FIGS. 1 to 11. In particular, optical diagrams (FIGS. 1 through 8) illustrate the optical principles relating to the present invention. It should be noted that these diagrams are drawn with the eye presented as a "reduced eye" (i.e. without their internal optical components, such as, for example, the crystalline lens, showing). However, the principle of the present invention will be adequately defined with such reduced eye optical diagrams showing only the anterior refracting surface, retina and pupil. Further, the actual antero-posterior (i.e. distance from front of eye—nearer the cornea, to back of eye—nearer the retina) location of image points relative to the retina have been exaggerated in these diagrams in order to present the concepts embodied in the present invention in greater clarity.

Figure 1:
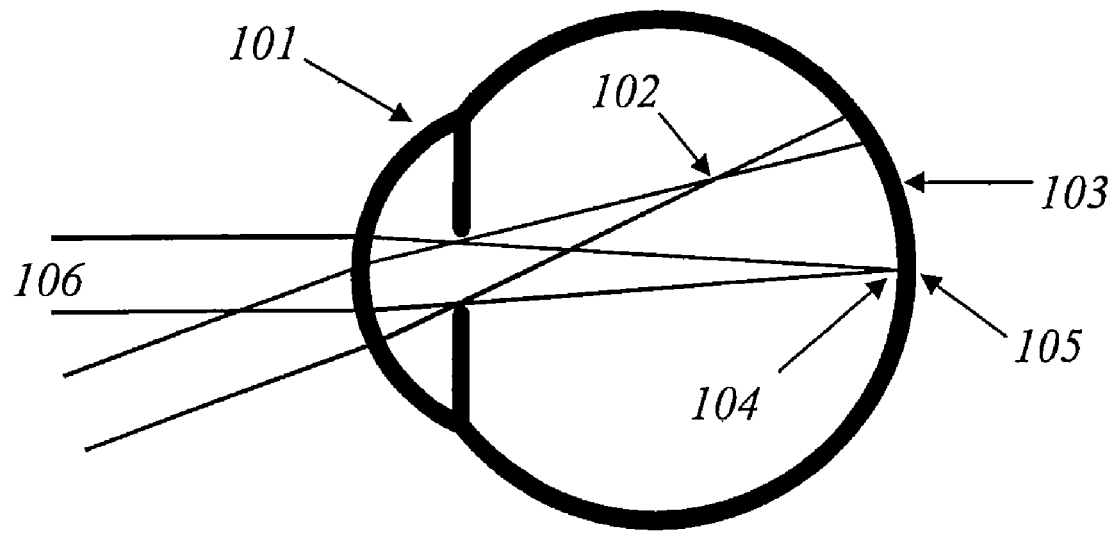
FIG. 1 is an optical diagram showing an eye, which is emmetropic centrally but is myopic in the periphery.
Figure 2:
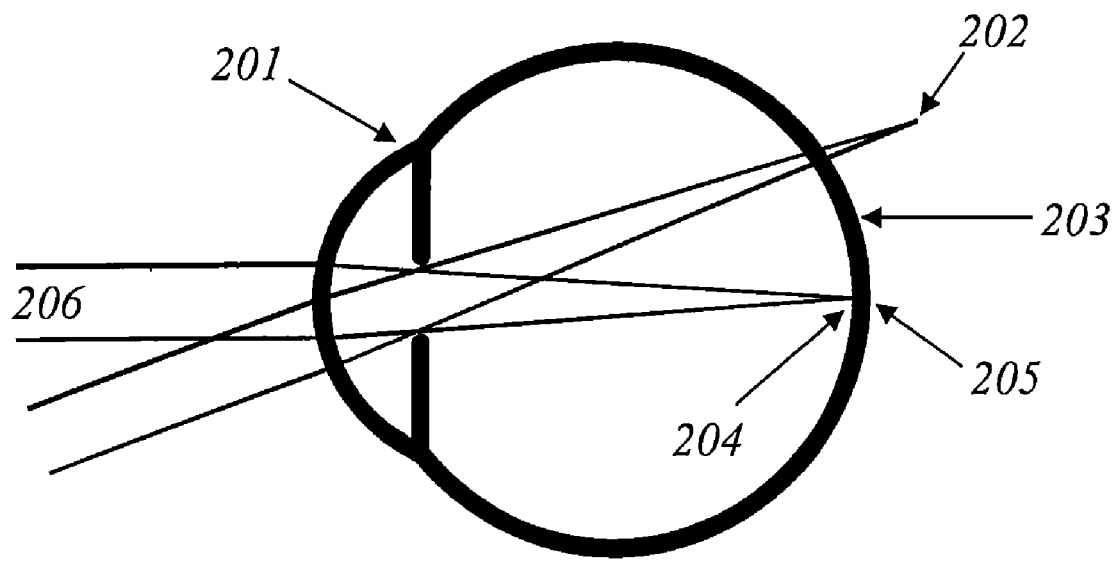
FIG. 2 is an optical diagram showing an eye, which is emmetropic centrally but is hyperopic in the periphery.

FIGS. 1 and 2 are optical diagrams illustrating eyes that are centrally emmetropic but peripherally ametropic.

In FIG. 1, the eye [101] is peripherally myopic while in FIG. 2, the eye [201] is peripherally hyperopic. The central emmetropia is seen from the positions of the central focal points [104] and [204] lying on the respective fovea [105] and [205]. In FIG. 1, with its peripheral myopia, the peripheral image point [102] is located in front of (i.e. in a direction that is towards the cornea from the retina) the peripheral retina [103]. In FIG. 2, with its peripheral hyperopia, the peripheral image point [202] is located behind (i.e. in a direction that is away from the cornea from the retina) the peripheral retina [203]. These eyes, by conventional vision correction practices, would not be deemed to require refractive vision correction devices as their central vision would already be optimal. Yet, their peripheral vision would not be optimal, and may be further improved.

FIGS. 1 and 2 are also representative of equivalent optical situations in which central refractive errors have already been corrected using conventional vision correction devices. In this case, the light rays [106] and [206] entering the eye may be thought of as light rays emerging from a conventional optical device not shown. The result is a residual ametropic state for the periphery (peripheral myopia for FIG. 1, peripheral hyperopia for FIG. 2).

The aim of the present invention is to control not only the central image position, but also the peripheral image position or positions. This is illustrated in the examples shown from FIGS. 3 to 8.

Figure 3:
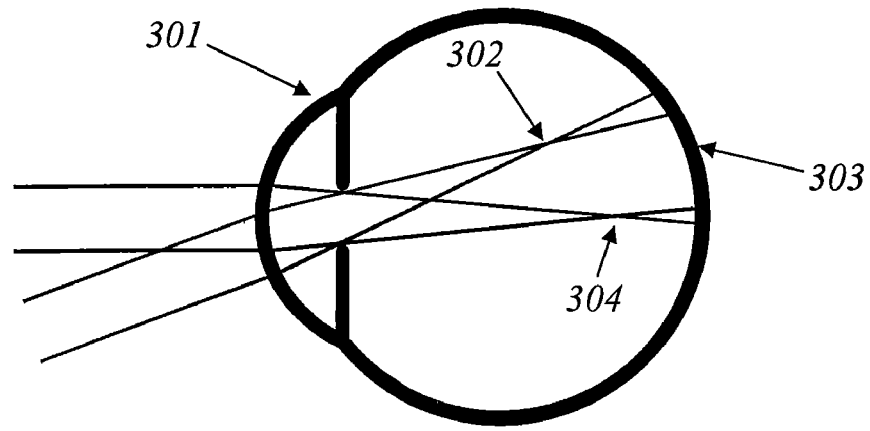
FIG. 3 is an optical diagram showing an eye, which is myopic centrally and with a greater amount of myopia in the periphery.

In FIG. 3, an eye [301] is illustrated that has an amount of central myopia and a greater amount of myopia in the periphery, as can be seen from the positions of the central [304] and peripheral image points [302] relative to the retina [303].

Figure 4:
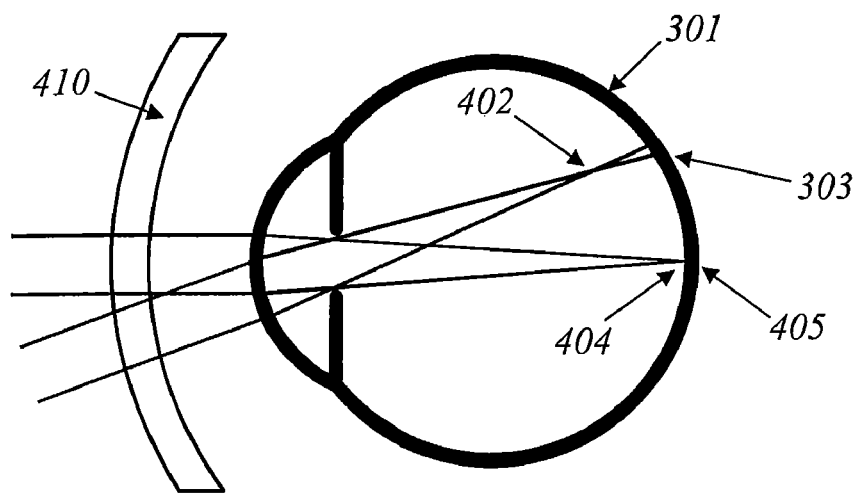
FIG. 4 is an optical diagram showing correction of the eye of FIG. 3 with a conventional device resulting in central correction but the periphery remaining myopic.

In FIG. 4, the eye [301] of FIG. 3 has been corrected using a conventional vision correction device [410] that only attempts to correct central/foveal vision. Thus, the central image point [404] has been relocated to the fovea [405]. Since such devices typically have optical power which is relatively constant (for correction of central vision) across its field of view, approximately the same refractive correction introduced to the central image point would have also been introduced to the peripheral image points. Hence, the peripheral image point [402] has also been relocated by some amount, but not sufficiently to place it on the peripheral retina [303]. Therefore, this eye remains myopic (albeit by a smaller amount than its original refractive state) peripherally and would not have optimum peripheral vision.

Figure 5:
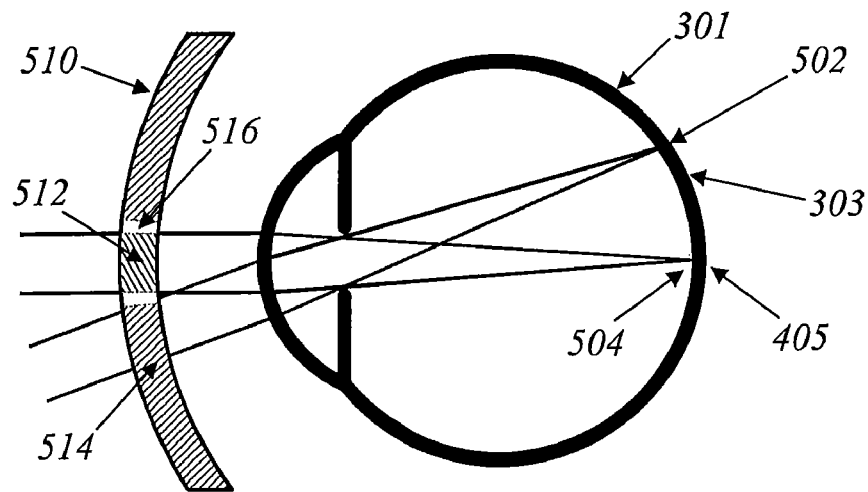
FIG. 5 is an optical diagram showing correction of the eye of FIG. 3 with an embodiment of the present invention resulting in correction of both central and periphery.

In FIG. 5, the eye [301] of FIG. 3 has been corrected using a device according to embodiments of the present invention [510]. In this device, the central, on-axis power provided through a central optic zone [512], is selected to correct central myopia while the peripheral power provided through optic zone [514], is selected to correct the greater amount of peripheral myopia. (The transition from the central optic zone [512] to the peripheral optic zone [514] may be facilitated by a blending region [516].) This results in the selected positioning of both central [504] and peripheral image points [502] to the correct location relative to the retina [303] and fovea [405] to provide optimal central and peripheral visual performance.

Figure 6:
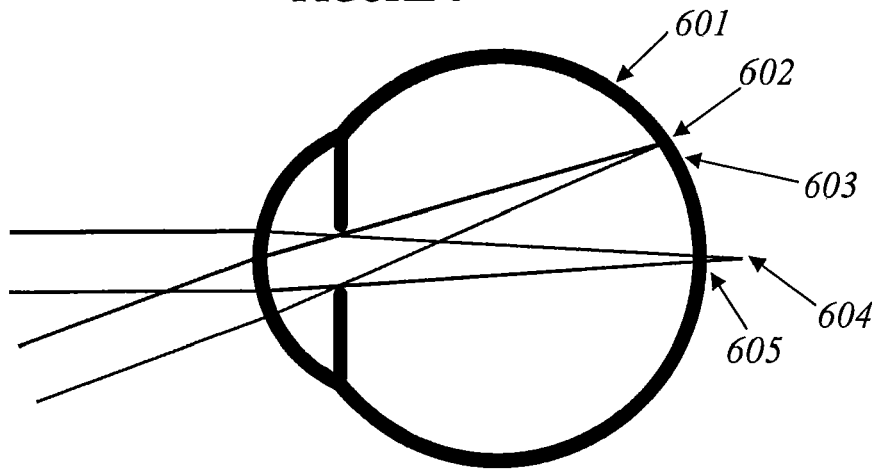
FIG. 6 is an optical diagram showing an eye which is hyperopic centrally but is emmetropic in the periphery.

FIG. 6 provides another example. In this case, the eye [601] is centrally hyperopic while its periphery is emmetropic. This can be seen by the central image point [604] being located behind the fovea [605] and the peripheral image point [602] lying near the peripheral retina [603].

Figure 7:
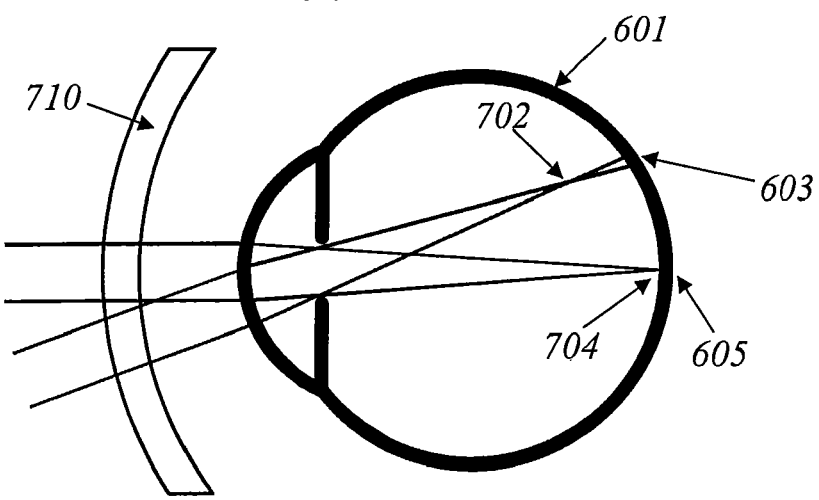
FIG. 7 is an optical diagram showing correction of the eye of FIG. 6 with a conventional device resulting in central correction with periphery rendered myopic.

In this case, correction of the eye of FIG. 6 with a conventional vision correction device [710], as illustrated in FIG. 7, would provide good central vision (the central image point [704] now lying on the fovea [605]) but renders the eye myopic in the periphery (the peripheral image point [702] now lying in front of the peripheral retina [603]). Thus, whereas prior to correction, the periphery was enjoying optimum or near optimum vision, the introduction of a conventional vision correction device effectively degraded peripheral vision.

Figure 8:
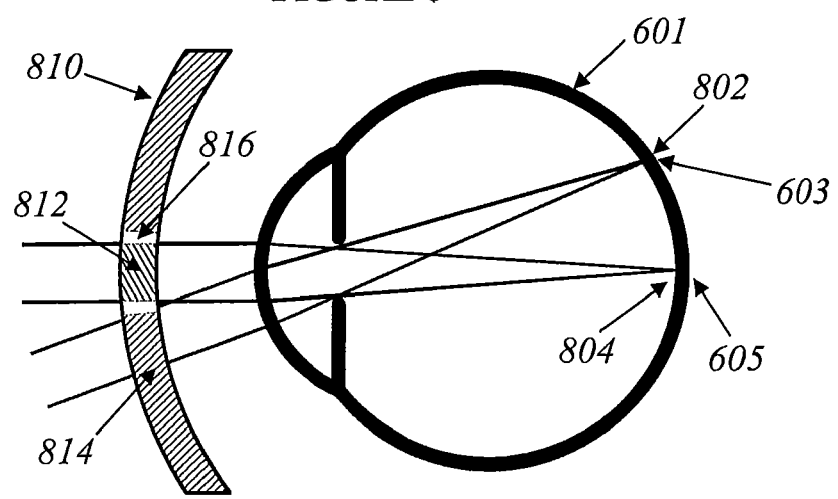
FIG. 8 is an optical diagram showing correction of the eye of FIG. 6 with an embodiment of the present invention resulting correction of both central and periphery.

This situation is solved by embodiments of the present invention. In FIG. 8, a vision correction device [810] according to embodiments of the present invention provides the appropriate amount of on-axis (central) power provided through a central optic zone [812] to correct the central hyperopia of the eye in FIG. 6. The peripheral (off-axis) power of this device is provided through a peripheral optic zone [814] selected to not introduce any change in image position in the periphery, thereby maintaining the good peripheral vision of the eye. A blending region [816] is between the central optic zone [812] and the peripheral optic zone [814]. As can be seen, both central [804] and peripheral [802] image points now lie on the fovea [605] and near the peripheral retina [603] respectively.

According to embodiments of the present invention, one aim is to correct and/or preserve not only central focus, but also peripheral vision. In many individuals, this may be determined by ascertaining the extent to which an eye is out of focus in the periphery.

As an alternative to optical diagrams, the above concept may be represented in numerical notations. For example, Table 1 below sets forth the tabular results representing the example of FIGS. 6 to 8. Here, it can be seen in the second row that the uncorrected refractive state of the eye is hyperopic by an amount equal to +2.50D while the periphery is emmetropic (and conventionally denoted as "plano" by practitioners of vision correction). A conventional device that corrects only the central refractive state of +2.50D (hence the same corrective power effect for both central and periphery as shown in the third row) would render the central refractive state emmetropic (fourth row), but also induce a state of myopia equivalent to −2.50D in the periphery. A device, according to embodiments of the present invention, would (as shown in the fifth row) provide the correct power for both the center and periphery. The net result is an emmetropic state for both central and peripheral vision (sixth row).

TABLE 1

|  | Central | Peripheral |
| --- | --- | --- |
| Uncorrected | +2.50 D | Plano |
| Corrective Effect of Conventional Device | +2.50 D | +2.50 D |
| Corrected With Conventional (+2.50) | Plano | −2.50 D |
| Corrective Effect of Embodiment of Invention | +2.50 D | Plano |
| Corrected With Embodiment of Invention (+2.50/plano) | Plano | Plano |

In practice and particularly for clinical applications, the prescription of a device according to embodiments of the present invention may be presented as an augmented form of the conventional vision correction prescription format. While it may also readily be applied to the astigmatic component (i.e. cylinder power and axis) of a prescription as understood by vision correction practitioners, this principle is briefly illustrated by referring only to the spherical power of a prescription.

In conventional practice, the prescription to correct a hyperope of three diopters would appear as

+3.00D

Only a single number is used as only the central foveal refractive state is of concern as discussed above.

As prescription for the present invention, should this +3.00D hyperope also have an emmetropic periphery as measured at, e.g. 30 degrees field angle, the prescription may read as:

+3.00D

Plano @ 30°

Should control of more than one peripheral image position be deemed beneficial, the prescription format may be readily augmented as follows. For example, suppose the above eye was further found to be −0.75D myopic at 45 degrees field angle and a device of the present invention is to be prescribed to improve peripheral vision at both 30° and 45° field, the prescription may read as:

+3.00D

Plano @ 30°

−0.75D @ 45°

As can now be seen, any number of peripheral powers may be specified to correct for any number of peripheral image positions. Also, by numerically joining a list of two or more peripheral powers, the prescription for devices of the present invention may be designated and fabricated as continuous or quazi-continuous mathematical functions (e.g. polynomials, splines, etc).

It can also be seen that more complex notations/prescriptions may be founded according to additional parameters. For example, should the amount of peripheral defocus be asymmetrical across the eye; e.g. −2.50D @ 30° in the nasal (i.e. in a direction along the eye towards the nose) field and −0.75D @ 30° in the temporal (i.e. in a direction along the eye away from the nose) field, the peripheral power of the device according to embodiments of the present invention may also need to be asymmetrical to provide appropriate control of peripheral vision for both nasal and temporal fields. Similarly, peripheral image position control for field angles along vertical and oblique meridians of the eye, both symmetrically and asymmetrically, are also contemplated.

As stated above, conventionally, vision correction was directed to the central foveal region. This was an inference based on the knowledge that retinal cell density is higher in the central region, as is visual acuity. The conventional practice is to neutralize the central refractive error and thereby optimize central visual acuity.

In the foregoing, our description of embodiments concentrated on one aspect of the present invention; that of correcting the peripheral refractive state. Those embodiments were prescribed to neutralize the peripheral ametropia in addition to correcting the central refractive state.

However, embodiments of the present invention recognize and take advantage of certain other aspects of vision and visual performance found in the peripheral regions, such as, for example, contrast sensitivity, motion detection, light detection, etc., which may be used as criteria parameters Further, improvements to peripheral vision in terms of any (or combinations) of the above criteria parameters may return benefits to the individual in terms of more clinically subjective (in vision correction, "subjective refers to assessments that require the patient's observations or preferences as opposed to "objective" which refers to direct measurements without requiring input from the patient) but equally important considerations such as subjective vision assessment, or subjective preference for the peripheral vision performance, or subjective preference for overall visual performance, clarity, acceptability, etc, for the individual. Many other subjective performance criteria/parameters which are clinically important to the individual patient are familiar to the practitioners of vision correction, and may be chosen as peripheral performance criteria for embodiments of the present invention. According to embodiments of the present invention, it is characteristics such as these and others in the peripheral focus that are sought to be "tuned" by methods and apparatuses of the present invention.

Contrary to other attempts at modifying peripheral effects, according to embodiments of the present invention, it is now recognized that aspects or characteristics of peripheral vision, such as, for example, contrast sensitivity, motion detection sensitivity, etc. are selectively changed or "tuned" via selective correction of the peripheral vision through precise optical refractive control, and readjusted image positioning on the periphery of the retina. In addition, since the resolution in the mid-periphery and peripheral retina is generally lower, the critical spatial frequency to which characteristics, such as, for example, contrast sensitivity, etc., should be tuned are thought to be different from the high spatial frequencies ordinarily associated with central visual acuity. As a result, it is possible that the optimal visual performance might not occur when the focus is 'perfect' (i.e. when peripheral refractive error has been neutralized).

Figure 9:
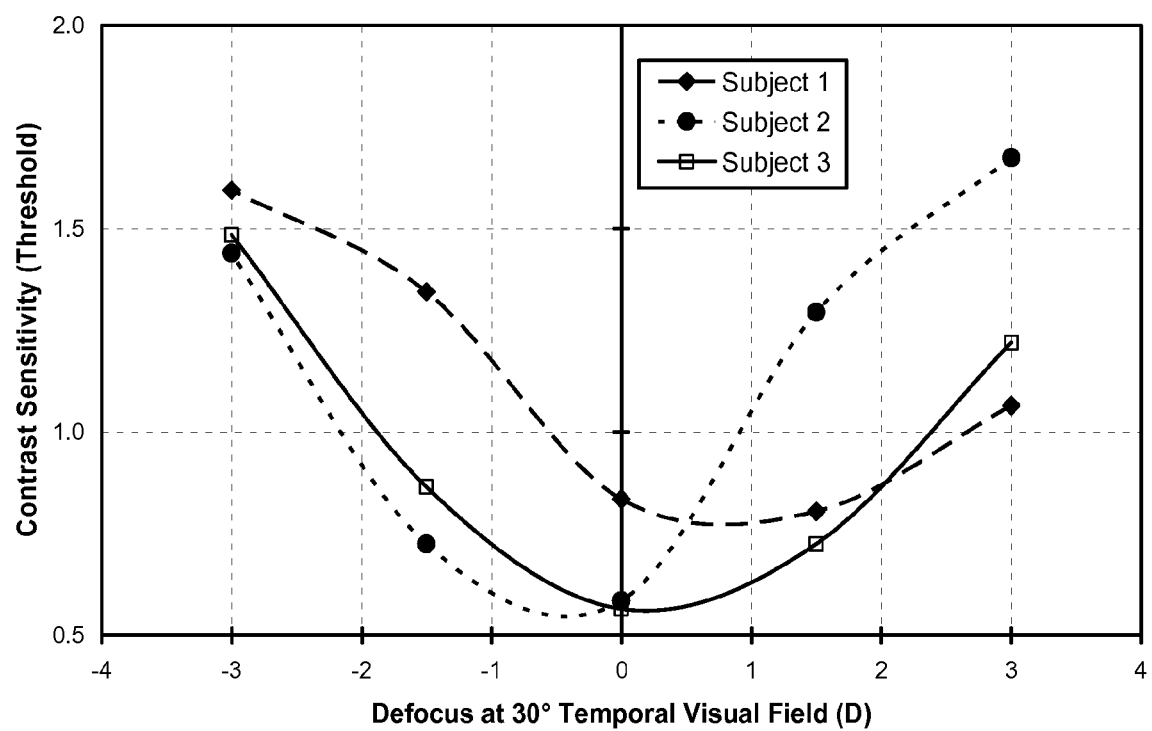
FIG. 9 is a plot of measured contrast sensitivity (as contrast threshold) against departure of peripheral refractive state from emmetropia (i.e. peripheral defocus) for three subjects.

Indeed, our experimental findings indicated that, for some individuals, peripheral defocus is not necessarily always the best predictor of peripheral vision. FIG. 9 shows the results from the measurement of peripheral contrast sensitivity of three subjects. Along the vertical axis, measured peripheral contrast sensitivity, indicated as contrast threshold, is shown (generally, the lower the contrast threshold, the better the visual performance). For these three subjects, first the peripheral refractive state was measured and then neutralized optically. Then peripheral contrast sensitivity was measured with different amounts of induced peripheral defocus from their best-corrected peripheral refractive state. Thus, along the horizontal axis, the amount of peripheral defocus (i.e. equivalent to an induced peripheral refractive state) is plotted.

It can be seen, from the interpolation of the curves joining the measured data points for each subject in FIG. 9, that the best contrast sensitivity achievable is not necessarily when peripheral defocus is fully neutralized. Thus, for a peripheral correction to satisfy a patient who subjectively prefers improvement of contrast sensitivity, the optimum peripheral refractive power may be one that is slightly "defocused" relative to a correction selected through measurement by objective refraction. Many other examples of using other criteria parameters as a guide to optimizing peripheral visual performance may be considered. A few follows by way of illustration of the principle.

For example, if detecting horizontal motion in the horizontal plane is of most importance (e.g. detecting vehicles entering a motorway from a side-street, or perceiving lateral airspace when piloting an aircraft, etc.), motion detection of sharp vertical edges may be of greater importance. Since the eye could have some amount of astigmatism (either refractive or from oblique astigmatism aberration), it might be useful to "tune" the peripheral focus so that the vertical line focus of astigmatism is on the retina.

Further, when playing a sport, the key visual object (e.g. football, puck, baseball, skeet, water fowl, etc.) might have a characteristic spatial frequency range or band due to, among other things, its shape, size, and critical distance. In this case, it may be more beneficial to set the peripheral focus so contrast sensitivity is maximized for those spatial frequencies, of spatial frequency band, etc.

Thus, while peripheral refractive state is a reasonable first approximation to improving and optimizing peripheral visual performance, to fully optimize peripheral vision, it may be necessary, in addition, to measure and monitor the change in visual performance according to the selected performance criteria parameters with different peripheral controls introduced. That is, the peripheral focus may have to be further "tuned" according to the most important visual task for the wearer.

Still, further, embodiments of the present invention contemplate maintaining the optimal central vision while correcting or modifying peripheral refraction. In this case, it is considered beneficial to begin improving or otherwise altering peripheral focus in an ocular device (contemplated according to embodiments of the present invention) slightly out from the center (e.g. out from the field angle that corresponds from little, to no effective overlap with the projection of the entrance pupil of the eye relative to central vision). Selecting the proper field angle to begin this process depends on precisely how much peripheral focus change is required, as well as the individual's "tolerance to changes" in vision over the central and paracentral region, pupil size (as well as the influence of the Stiles-Crawford effect), etc.

EXAMPLES

Clinical Example 1

A myopic adult patient of −5.00D was wearing conventional soft contact lens. Central over-refraction (i.e. refractive error measured on top of the contact lens being worn) over one eye was found to be −0.21D indicating the conventional contact lens was correcting his central vision adequately. This was verified by contrast sensitivity measurements returning a central contrast sensitivity threshold of 0.175. However, for that eye, it was found by peripheral over-refraction (using essentially the same instrumentation as for the measurement of central refraction with the exception that the patient is instructed to fixate on a target point positioned at an appropriate field angle so that the peripheral refraction is measured) that at 30 degrees, the eye was hyperopic at around +3.08D. This indicates that the conventional contact lens was not correcting the peripheral defocus adequately. In effect, the central refraction of the eye was −5.00D+−0.21D=−5.21D myopia while in the periphery at 30 degrees field angle, the eye was −5.00D+3.08D=−1.92D myopic. Thus, the wearing of a conventional contact lens that corrected the central −5.00D myopia inappropriately introduced a residual amount of hyperopia to the periphery. This may be particularly visually discomforting for the patient who is more accustomed to visual sensation associated with the uncorrected, myopic periphery. Contrast sensitivity measured at this peripheral field angle was found to be at a contrast threshold of 1.615, (a higher contrast threshold indicates a poorer visual performance), while visual acuity measurement at this peripheral angle was found to be at 1.242 Log MAR units.

A contact lens according to the principle of embodiments of the current invention was used to correct this eye. This contact lens had the same central corrective strength (i.e. −5.00D) as the conventional lens worn by the patient, but the peripheral power of this contact lens, delivered −2.00D to the eye at around 30 degrees field angle. Peripheral contrast sensitivity of the eye now wearing the contact lens of the current invention returned a much improved performance (i.e. lower contrast threshold) of 1.04 while peripheral visual acuity was found also to be improved, at 0.975 Log MAR units (a lower Log MAR unit indicates better visual acuity).

This patient also reports a general subjective preference of the quality of vision when wearing the contact lens of the current invention compared to the conventional contact lens.

The peripheral visual performance of the example eye may be further enhanced by trial testing other contact lenses with slightly differing peripheral refractive strengths. Using an iterative, e.g. stepwise or binary search approach, the most suitable peripheral power may be found that delivers optimum visual performance according to the performance criteria parameters; which in this example included peripheral contrast sensitivity, peripheral visual acuity as well as overall subjective preference on the part of the patient.

The basic concept is illustrated in Clinical Example 2.

Clinical Example 2

A pre-teen low myope wearing a conventional soft contact lens was found to achieve a peripheral contrast sensitivity threshold of 0.87 and 0.99 respectively for the temporal and nasal field angles of 30 degrees. (It is known that some eyes possess asymmetrical peripheral refractive states; e.g. nasal field more myopic than temporal field, etc., which can lead to asymmetric visual performances.) Peripheral refraction suggested the peripheral field was relatively hyperopic. Hence, a lens according to the principle of the present invention was placed on the eye to test its ability to improve peripheral contrast sensitivity. This lens introduces an additional +1.50D to the peripheral refractive power at the field angle of 30 degrees. The resultant contrast sensitivity thresholds were improved to 0.59 and 0.91 respectively for the temporal and nasal fields.

Additional lenses according to the principle of the present invention, but which had incrementally greater amounts of peripheral refractive power, were placed on the eye to assess their impact on peripheral contrast sensitivity. At the peripheral additional power of approximately +2.50D at 30 degrees, the resultant contrast sensitivity threshold was worsened, returning 0.97 for temporal and 1.17 for nasal field (for approximately +2.50D additional peripheral refractive power). At a still greater peripheral additional power of approximately +3.00D at 30 degrees, the resultant contrast sensitivity worsened further, to 1.07 and 1.37 for temporal and nasal field respectively. The latter two cases therefore returned worse peripheral visual performance than for the conventional contact lens.

This particular example demonstrates how peripheral visual performance (in this case, in the form of contrast sensitivity) can be improved using the appropriate peripheral power in a device of the present invention. It further demonstrates how by placing the peripheral image in front of the retina with sufficiently high amounts of peripheral additional power (as prescribed by the myopia treatment method in our earlier work) the peripheral visual performance can potentially be degraded for some individuals.

Clinical Example 3

A young emmetrope was found to have a central contrast sensitivity threshold of 0.31 and a peripheral contrast sensitivity of 0.71 for the temporal field angle of 30 degrees. The results from peripheral refraction revealed the peripheral field was relatively myopic. A lens that introduced an additional −0.50D to the peripheral refractive power at the field angle of 30 degrees was placed on the eye to test its ability to improve peripheral contrast sensitivity. The resultant contrast sensitivity thresholds were improved to 0.24 and 0.65 for the central and the temporal fields respectively.

An additional lens according to the principle of the present invention, but which had a greater amount of positive peripheral refractive power, was placed on the eye to assess its impact on peripheral contrast sensitivity. At the peripheral power of approximately +3.00D at 30 degrees, the resultant contrast sensitivity worsened to 0.51 and 1.15, for the central and temporal fields respectively.

This example demonstrates how peripheral visual performance in an emmetropic eye (in terms of contrast sensitivity) can be either further improved or degraded by modulating peripheral refractive power in a device of the present invention.

Given the foregoing clinical examples, therefore, in one embodiment, one or more criteria parameters of peripheral visual performance, such as objective visual optical parameters including, for example, contrast sensitivity, visual acuity, motion detection, light detection, etc., or subjective, qualitative parameters including, for example, subjective visual quality, apparent vision 'normalcy', peripheral or overall vision preference, visual discomfort, etc, are selected as the indicator(s) for peripheral vision improvement. The peripheral refractive state of the eye is then measured. From that result, the change in peripheral refractive effect required to optimize the criteria parameters of peripheral visual performance is estimated. This may be done initially by selecting a device with peripheral refractive effect that approximately neutralizes the peripheral refractive state of the eye while simultaneously provide the appropriate central refractive correction.

Should the selected device prove to provide adequate/acceptable level of peripheral performance, that device may be immediately dispensed. Should improvements be required, further refinement and optimization of peripheral visual performance may then be achieved iteratively by applying differing, incremental peripheral refractive effects to the eye and measuring the response in the criteria parameters. After such progressively optimizing iterations, the best correction is selected, or the best result can be interpolated/extrapolated from the results obtained during the iterations.

Since, these "trial" lenses need not optimize or correct the central vision, the trial lenses could be single vision lenses. In addition, it is also possible to fabricate a kit or "trial set"

consisting of two or more test devices with differing amounts of peripheral refractive effects for the purpose of changing peripheral refractive effects incrementally on an eye specifically for the purpose of facilitating the rapid, iterative convergence to the optimum peripheral prescription for a patient.

Optionally to the selection based on either the peripheral refractive state or the employment of an iterative prescription approach, a prescription for peripheral refractive effect in a device according to embodiments of the present invention could be selected by establishing a look-up table relating criteria response to refractive state in the periphery, for example, after collecting requisite data from studies directed to the relationship between the two parameters. An example of how such data may be obtained and collated for the criterion of contrast sensitivity can be appreciated from FIG. 9. In FIG. 9, while individual responses are shown for three subjects, it is possible to summarize the data into a 'typical' response based on the average of all subjects. In this way, and by collecting the data from a greater numbers of subjects, the relationship between peripheral refractive state and contrast sensitivity is built up to establish a population response curve. Similar curves may be obtained in the same way for other criteria parameters.

As a further option to selecting a prescription for peripheral refractive effect based on the measured peripheral refractive state, the selection for the device (whether initial or for dispensing) may be established by considering, simply, the central refractive state of the eye. Our research has shown that there is a population trend relating central refractive state to peripheral refractive state. In FIG. 10, the peripheral refractive state for the nasal visual field at 30 degrees field angle is plotted along the vertical axis against the central refractive state of the same eye. It can be seen that there is a strong trend relating the two refractive states.

Thus, selection of an appropriate device of the present invention to improve peripheral visual performance may be achieved in many patients by consideration of their central refractive error and then referring to the population average relationship between central and peripheral refraction at selected field angles.

As will now be appreciated, similar relationships to FIG. 10 may be established at different meridians (e.g. horizontal-temporal, horizontal-nasal, vertical-superior, oblique along the 45 degree meridian, etc) and at different field angles in order to facilitate the initial selection, or adequate final selection, of the peripheral refractive effect of a device of the present invention to improve, enhance and optimize peripheral visual performance.

One suggested protocol (shown in FIG. 11), contemplated by embodiments of the present invention, comprises the steps of:

1. Identifying or measuring a patient's central refractive state.
2. Measuring the patient's peripheral refractive state at one or more peripheral positions.
3. Selecting a lens, that will correct central refraction and also modify (or correct) peripheral refraction.
4. Present corrective device to the eye.
5. Evaluating the patient's peripheral vision performance according to one or more selected criteria parameters (e.g. contrast sensitivity, motion detection, light detection, subjective visual quality, subjective overall preference, visual discomfort, etc.)
6. Repeat iterations from step 4 with different peripheral refractive effect, if required, until peripheral performance is adequate or optimized.

As would be understood by a practitioner of vision correction once provided with the above protocol, not all of the above steps are obligatory, depending on the level of optimization of peripheral vision and overall vision desired. It can be appreciated from the foregoing discussion that Step 2 of the above procedure may be replaced by referring to normative population relationship between central and peripheral refractive states. Also from the foregoing discussion, Step 3 may be facilitated or refined by referring to a population relationship between peripheral refractive state and the peripheral visual performance criteria parameter(s).

Although conventionally, vision correction is generally provided for distance viewing, such as, for example, for corrections for presbyopic individuals, the method and devices according to embodiments of the present invention may also be used to improve or optimize peripheral visual performance at any viewing distance other than distance viewing as would be understood by practitioners of vision correction.

While the foregoing discussion on enhancement of peripheral visual performance has been illustrated by reference to only one eye, since the visual system is binocular, this invention also provides for the improvement, enhancement and optimization of peripheral visual performance at different viewing distances for different eyes of an individual. This is particularly useful, for example, for presbyopic individuals, or for individuals with particular vocational needs (e.g. microscopists who, when operating microscopes monocularly, may benefit from one eye optimized 'globally' for distance (through the eyepiece of the microscope) and one eye optimized 'globally' for near (for reading/writing notes), etc.

According to the embodiments, the present invention contemplates using any useful means of vision correction to effect the peripheral vision improvement. These include lenses, devices and ocular systems such as, contact lenses, spectacle lenses, onlay/inlays, anterior and posterior chamber intraocular lenses, orthokeratology systems, and refractive corneal surgery (PRK, LASIK, etc.).

The invention may be embodied in other specific forms without departing from the spirit or essential characteristics thereof. The present embodiments are therefore to be construed in all respects as illustrative and not restrictive, the scope of the invention being indicated by the claims set forth below rather than by the foregoing description. All changes which come within the meaning and range of equivalency of the claims are therefore intended to be embraced therein.

We claim:

1. A kit comprising at least two contact lenses:
   wherein said contact lenses each comprise a central optical zone, at least one peripheral optical zone, and at least one blending region;
   wherein said central optical zone provides a first corrective factor to, the first corrective factor power for affecting central refraction of an eye when fitted on the eye;
   said peripheral optical zone providing a second corrective factor to control the position of peripheral image points; and
   said blending region residing between adjacent central optical zone and peripheral optical zones to provide mechanical and geometrical continuity between adjacent zones; and
   wherein, each said contact lens provides a different first corrective factor and a different second corrective factor; and
   wherein the second corrective factor controls the position of said peripheral points so as to be suitable for optimizing contrast sensitivity of an eye at said peripheral image points;

wherein, for each said contact lens, said peripheral image points comprise an image point at 30 degrees temporal field and the refractive power of the second corrective factor at 30 degrees temporal field is non-zero and approximately two-thirds of a refractive power of the first corrective factor.

2. The kit of claim 1, wherein the first and second corrective factors of at least one contact lens in the kit have a negative refractive power and the first and second corrective factors of at least one other contact lens in the kit have a positive refractive power.

3. A kit as claimed in claim 1, wherein the kit further comprises a contact lens with a first corrective factor of approximately zero and a non-zero second corrective factor.

* * * * *

UNITED STATES PATENT AND TRADEMARK OFFICE
CERTIFICATE OF CORRECTION

PATENT NO. : 8,057,034 B2  
APPLICATION NO. : 12/256705  
DATED : November 15, 2011  
INVENTOR(S) : Arthur Ho et al.

Page 1 of 1

It is certified that error appears in the above-identified patent and that said Letters Patent is hereby corrected as shown below:

Column 5, line 11 "optic zone [514], is selected to correct the greater amount of" should read
--a peripheral optic zone [514] is selected to correct the greater amount of--.

Column 12, line 52 "factor to, the first corrective factor power for affecting" should read
--factor to the first corrective factor power for affecting--.

Signed and Sealed this
Third Day of January, 2012

David J. Kappos
*Director of the United States Patent and Trademark Office*